2,709,645

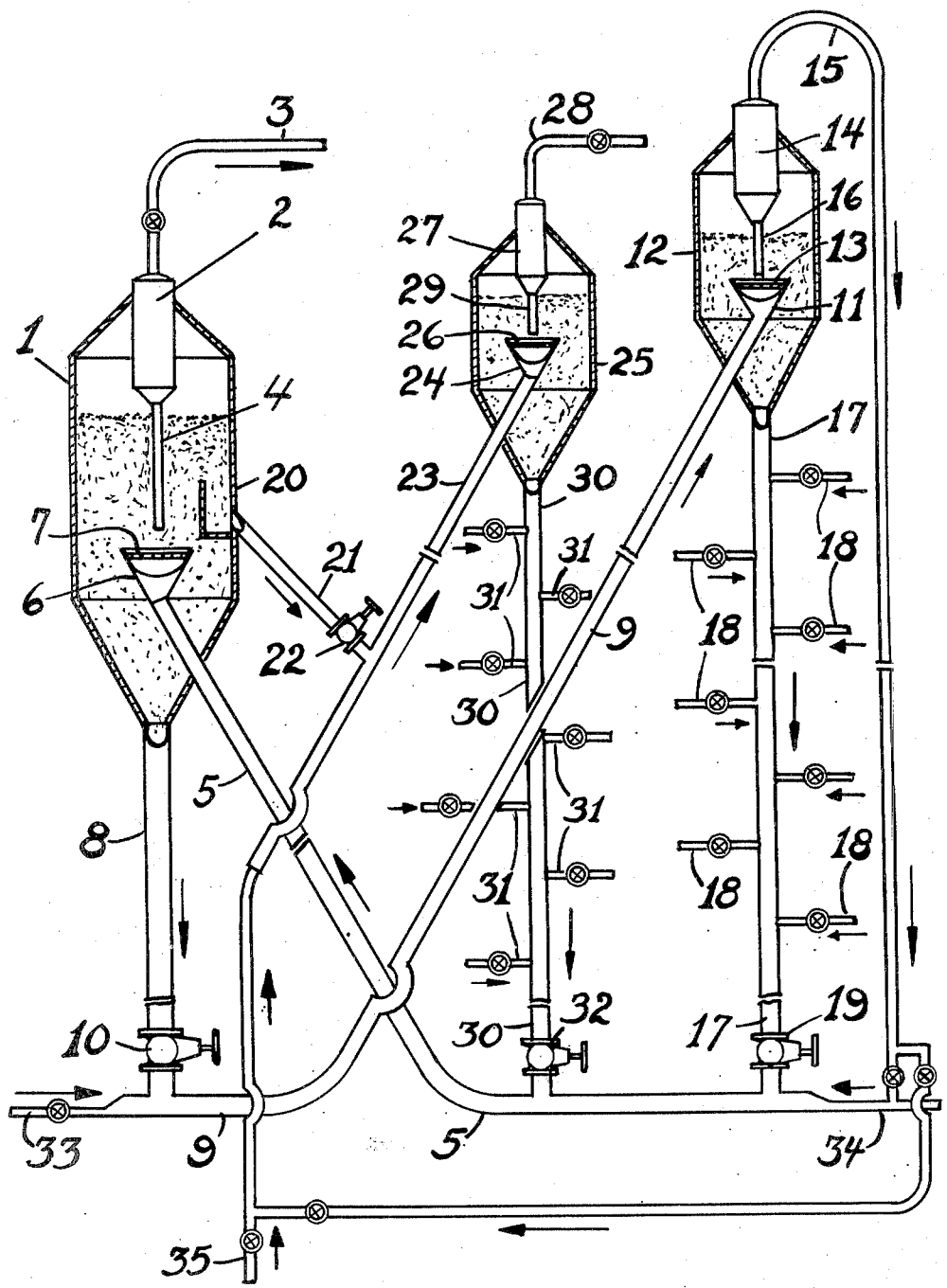

PRODUCTION OF INDUSTRIAL GASES

Ralph M. Hill, Mountainside, and Charles S. Lynch, Plainfield, N. J., assignors to Esso Research and Engineering Company, a corporation of Delaware Application November 15, 1946, Serial No. 709,938

12 Claims. (Cl. 48—196)

The present invention is directed to a method for producing industrial mixtures of carbon monoxide and hydrogen. More specifically, the invention contemplates the production of such a mixture in suitable proportions for use in the production of liquid hydrocarbons by what is known as the Fischer-Tropsch synthesis.

In the production of industrial mixtures of carbon monoxide and hydrogen, one of the most serious problems is to produce such a mixture free from substantial amounts of contaminants, such as carbon dioxide, nitrogen, methane, and the like. It has been proposed to produce such mixtures by burning a hydrocarbon, such as methane, with pure oxygen. This, of course, creates immediately the problem of producing the pure oxygen in an economical manner.

It has also been proposed to react hydrocarbons, such as methane, with metal oxides under conditions under which the metal oxide will give up some of its oxygen. Ordinarily this procedure involves difficult control problems because of the tendency of the reaction to go toward the production of carbon dioxide. A metal oxide which produces a product gas of desirable composition is zinc oxide, but working with this oxide is rendered difficult by the volatility of the metallic zinc.

The oxide which most readily suggests itself for use in a process of this type is iron oxide, both because of its cheapness and availability and the readiness with which it is regenerated after undergoing reduction. It is principally to a process of the type described in which iron oxide is employed that the present invention is directed.

The greatest drawback to the use of iron oxide to supply the oxygen for oxidation of hydrocarbons such as methane is that the reaction follows a course which does not lead to the desired product gas. Considerable experience with various types of iron oxides indicates that the course followed by the reaction, for example, of methane with the oxide, is, first, practically complete conversion of the methane to carbon dioxide followed shortly thereafter by a rapidly increasing conversion of methane to carbon and hydrogen with carbon monoxide appearing in an intermediate stage, usually in an amount which increases with time to a maximum which, however, is far below the desired level and then falls off. It is assumed that this course of reaction arises from the production of free iron in the catalyst bed at an early stage and that this free iron acts as a cracking catalyst, the amount of free iron increasing as the operation progresses and, therefore, the production of carbon increasing with time. This theory of the mechanism of the reaction naturally points to the desirability of so conducting the reaction as to avoid the presence of free iron.

The present invention is based on the discovery that, contrary to expectation, if free iron is included in the reaction mixture at the outset in an amount bearing a predetermined relation to the amount of iron oxide present, the reaction progresses much more smoothly with a high selectivity for the production of carbon monoxide and hydrogen and with practically no formation of carbon. The amount of free iron to be incorporated in the reaction mixture varies within limits which may be generally expressed as being such that the atomic ratio between oxygen and iron in the mixture is between 1.25 and .5 to 1, which is equivalent to an oxygen concentration of about 12.5 to 26.3% in the said mixture, at least $2/15$ of a gram atom of free iron being present per gram atom of oxygen. This ratio of iron to combined oxygen may readily be achieved by a suitable combination of free iron with iron oxides. A very effective combination is one in which one gram atom of free iron is combined with one gram mol of $Fe_2O_3$. Various other combinations will suggest themselves, the important point being that a substantial part of the iron present in the mixture from the start is present as free iron and that the reaction be not continued to the point where the free iron in the mixture substantially exceeds the upper limit heretofore given.

The employment of a contact mass containing free iron in admixture with iron oxide according to the present invention does not fundamentally change the other operating conditions customary with a reaction of this type. In general, variations of these other reaction conditions vary the extent of the conversion of the hydrocarbon in a known manner without substantially changing the composition of the product gas. The reaction temperature, for example, may vary between 1600° and 2000° F. The pressure maintained in the reactor can be varied over a fairly wide range, up to about 600 lbs./sq. in. The rate at which the feed gas is passed over the contact mixture may also be varied within substantial limits as from at least 5.0 v./v./hr. to as high as 500 v./v./hr. and will, in general, be higher the higher the temperature employed. The period for which the hydrocarbon gas can be passed over the contact mass is limited, as before indicated, by the extent to which free iron is formed in the mixture, and this period will depend on various other factors involved to such an extent that no definite limits for it can be stated. By periodically analyzing the contact mixture, however, it can be determined when this period is terminated. This, of course, can also be ascertained from an analysis of the product gas.

The foregoing discussion has dealt with an operation in which the contact mass is employed as a fixed bed. The preferred operation, according to the present invention, is one in which the contact mixture is employed in finely divided form in suspension in the feed gas in accordance with the technique commonly referred to as the fluidized solids technique. In this type of operation the solids employed will preferably have a degree of fineness less than 10 mesh, predominantly smaller than about 100 mesh, and will be present in a plurality of sizes suitably combined to impart to the mixture good fluidizing properties. This means that there should be particles as fine as, or finer than, 20 microns in a substantial amount, as well as particles of larger size, the smaller sizes, say from 20 to 80 microns, constituting not more than 30% of the mixture. With the solids present in various sizes, of the order of magnitude heretofore mentioned, the feed gas is passed through the contacting zone at a velocity selected to insure proper fluidization and the maintenance of a dense phase of solid particles in the reactor. Generally this velocity will be between about .3 and 5 ft./second, depending on the particle size distribution. Usually a velocity between about .5 and 2 ft. will give satisfactory fluidization.

In operating according to the fluidized solid technique, it is customary to employ at least two reactors, in one of which the hydrocarbon contacts the mixture of free metal and metal oxide and in the other of which the spent solid mixture from the first reactor is oxidized by being blown with air. It is important to observe that the flow of solids in such an operation will be so regulated that at no time will the free metal content in the solid mixture in the hydrocarbon reactor exceed the limit heretofore specified. This means that at all times the flowing stream of solids will consist of a mixture of free metal and metal oxide.

The nature of the present invention will be more clearly understood from the following detailed description of the accompanying drawing in which the single figure is a front elevation in diagrammatic form of one type of unit suitable for the practice of said invention.

Referring to the drawing in detail, numeral 1 designates a reactor provided at its upper end with a cyclone or other separator 2 from which gas leaves through line 3 and solid falls back into the reactor through line 4. Near the bottom of the reactor is an inlet line 5 terminating within the reactor in a funnel 6 covered with a grid or grate 7.

The bottom of the reactor is provided with a draw-off line 8 emptying into a conduit 9 and provided with a slide valve or other suitable control element 10. The line 9 has an open end for the introduction of gas for carrying the finely divided solid through the conduit. Line 9 terminates in a funnel 11 in chamber 12 which is similar to reactor 1. Funnel 11 is also provided with a grid or grate 13. In the upper part of chamber 12 is a cyclone or other separator 14 from the top of which gas leaves through line 15 and from the bottom of which solid is returned to chamber 12 through pipe 16. Depending from the bottom of chamber 12 is a standpipe 17 provided with aerating jets 18 and a slide valve or other control element 19 and emptying into conduit 5.

Reactor 1 is provided with a side wall receptacle 20 having a draw-off line 21 at its bottom provided with a slide valve or other control element 22 and emptying into a conduit 23. Conduit 23 terminates in a funnel 24 arranged in a chamber 25 similar to chamber 12. Funnel 24 is covered with a grid or grate 26. Chamber 25 is provided at its upper end with a cyclone or other separator 27 having an upper gas outlet 28 and a lower solids draw-off 29. Depending from the bottom of chamber 25 is a standpipe 30 provided with aerating jets 31 and a slide valve or other control element 32 and emptying into line 5.

Conduits 9, 17, 23 and 30 are shown broken to indicate that chambers 12 and 25 are located at a much higher level than reactor 1. The purpose of this arrangement is to build up a pressure head at the bottoms of stand pipes 17 and 30 so that reactor 1 may be operated at an elevated pressure while the operations in chambers 12 and 25 may be conducted at lower or atmospheric pressure.

In carrying out the process of the present invention, a suspension of finely divided iron and iron oxide containing at least 5% by volume of solid is maintained in reactor 1. The level of the dense suspension is maintained where desired by adjusting the velocity of the gas through the reactor and the rate of feed of solid into line 5. The gas fed to the reactor is ordinarily a hydrocarbon, such as, methane.

Reduced iron oxide-iron mixture is withdrawn from the reactor 1 through line 8 and conducted through conduit 9 into chamber 12. The carrying gas may be an oxidizing gas, such as air, oxygen, steam, carbon dioxide, or mixtures of two or more of these such as steam and oxygen. Ordinarily, the oxidation in chamber 12 can be controlled so as to maintain in the mixture in reactor 1 the desired percentage of free iron. Whether or not this control is being maintained may be readily ascertained by sampling the mixture in reactor 1 and analyzing it for free iron content.

For easier control of the composition of the mixture of solids fed to reactor 1, a portion of the mixture in 1 is continuously withdrawn through line 21 and fed to chamber 25 suspended in a reducing gas. By continuously operating chamber 12 under oxidizing conditions and chamber 25 under reducing conditions, the desired composition of solids in reactor 1 may be readily maintained.

The solids in chambers 12 and 25 are maintained in the same fluidized state of dense suspension as the solids in reactor 1. The oxidizing gas is fed into conduit 9 through line 33. The hydrocarbon is fed into line 5 through line 34. When steam is used as the oxidizing gas, with or without free oxygen, the off gas from chamber 12 will ordinarily be of a reducing nature. This gas may be fed to conduit 23 or a separate reducing gas may be introduced through line 35. Also, if desired, where the off gas from chamber 12 is composed mainly of steam and hydrogen, it may be fed to line 5 with the hydrocarbon. Alternatively, in this case, the gas from chamber 12 may be combined directly with the product gas in line 3 to increase the hydrogen content of the latter.

The following comparison indicates the nature of the improvement resulting from the present invention. Two runs were made in which methane was passed at 1700° F. into contact with oxygen-yielding, ferrous solid. In the one run the ferrous solid was FeO while in the other run it was a mixture of $Fe_2O_3$ and Fe having an atomic ratio of oxygen to iron of one which is equivalent to about 22.3% oxygen. In the first run, using FeO, after the reactor had been on-stream 60 minutes with a feed rate of 70–100 v./v./hr., the operating data indicated a methane conversion of 99.4%. Of the converted methane 31% appeared in the product as CO, 16% appeared as $CO_2$ and 53% appeared as carbon. In the second run, after the reactor had been on-stream for 70 minutes with a feed rate of 140 v./v./hr., the operating data showed a conversion of 48.8% of methane. Of the converted methane 69% appeared as CO, 31% appeared as $CO_2$ and none appeared as carbon. It will be seen, therefore, that, while in the two cases the atomic ratio of oxygen to iron was the same, when the free iron was present there was no carbon formation and a much higher selectivity to CO at a much higher feed rate.

In practicing the present invention in the specific embodiment described, it is desirable to admix with the ferrous material a refractory light carrier, such as MgO, $Al_2O_3$, or the like. This light material in finely divided form may be mixed with the powdered ferrous material or the latter may be deposited on the refractory material by any of the commonly known techniques. This light material improves the fluidizing properties of the ferrous material and serves to prevent agglomeration at the elevated temperatures employed.

The nature and objects of the present invention having thus been set forth and specific examples of the same given, what is claimed as new and useful and desired to be secured by Letters Patent is:

1. A method for converting a gaseous hydrocarbon into a gas containing carbon monoxide and hydrogen which comprises establishing a pair of zones, the first being a reaction zone and the second being a regeneration zone, circulating between said zones a suspension of finely divided particles of a mixture of iron oxide and metallic iron, maintaining in said reaction zone a dense suspension of said particles by flowing hydrocarbon gas upwardly through said zone at a superficial velocity between about 0.3 and 5 ft./second, maintaining in said reaction zone a temperature suitable for reaction between the gaseous hydrocarbon and said iron oxide to form carbon monoxide and hydrogen, maintaining a dense suspension of said finely divided particles in said regeneration zone by passing an oxidizing gas upwardly through said regeneration zone at a velocity between 0.5 and 5.0 ft./second at a temperature suitable for the oxidation of metallic iron and controlling the circulation of said particles from the reaction zone into the regeneration zone and thence back into the reaction zone to maintain an atomic ratio of oxygen to iron in the finely divided particles in the reaction zone between about 0.5 and 1.25 to 1, at least a portion of said iron being in the metallic state.

2. A method for converting a gaseous hydrocarbon into a gas containing carbon monoxide and hydrogen which comprises passing said gaseous hydrocarbon upwardly through a reaction zone at a superficial velocity between about 0.5 and 5 ft./second, maintaining a suspension of finely divided particles of a mixture of iron oxide and metallic iron in said gaseous hydrocarbons in said reaction zone, said suspension containing at least about 5% by volume of said finely divided particles, maintaining in said reaction zone a temperature suitable for reaction between said gaseous hydrocarbon and said finely divided particles to produce carbon monoxide and hydrogen, continuously withdrawing finely divided particles from said reaction zone, continuously feeding said withdrawn particles to an oxidizing zone, maintaining a temperature suitable for the oxidation of metallic iron in said oxidizing zone, withdrawing oxidized finely divided particles from said oxidizing zone and returning them to said reaction zone and controlling the rate of circulation of said particles from the reaction zone into the oxidizing zone and thence back into the reaction zone to maintain an atomic ratio of oxygen to iron in the finely divided particles in the reaction zone between about 0.5 and 1.25 to 1, at least a portion of said iron being in the metallic state.

3. A method for converting a gaseous hydrocarbon into a gas containing carbon monoxide and hydrogen which comprises passing said gaseous hydrocarbon upwardly through a reaction zone at a superficial velocity between about 0.5 and 5 ft./second, maintaining a suspension of finely divided particles of a mixture of iron oxide and metallic iron in said gaseous hydrocarbons in said reaction zone, said suspension containing at least about 5% by volume of said finely divided particles, maintaining in said reaction zone a temperature suitable for reaction between said gaseous hydrocarbon and said finely divided particles to produce carbon monoxide and hydrogen, continuously withdrawing product gas from the reaction zone, continuously withdrawing finely divided particles from said reaction zone, continuously feeding said withdrawn particles together with an oxidizing gas containing a large proportion of steam to a regeneration zone, maintaining a temperature suitable for the oxidation of metallic iron in said regeneration zone, withdrawing off gases from the regeneration zone and combining the same with the aforesaid product gases, withdrawing oxidized finely divided particles from said regeneration zone and returning them to said reaction zone and controlling the rate of circulation of said particles from the reaction zone into the regeneration zone and thence back into the reaction zone to maintain an atomic ratio of oxygen to iron in the finely divided particles in the reaction zone between about 0.5 and 1.25 to 1, at least a portion of said iron being in the metallic state.

4. The method as defined in claim 1 in which the atomic ratio of oxygen to iron in the finely divided particles within the reaction zone is 1 to 1.

5. The method as defined in claim 1 in which at least ⅙ of a gram atom of free iron is present for each gram atom of oxygen in the finely divided particles within the reaction zone.

6. The method as defined in claim 2 in which the atomic ratio of oxygen to iron in the finely divided particles within the reaction zone is 1 to 1.

7. The method as defined in claim 2 in which at least ⅙ of a gram atom of free iron is present for each gram atom of oxygen in the finely divided particles within the reaction zone.

8. In a method for converting a gaseous hydrocarbon into a gas containing carbon monoxide and hydrogen by contacting a gaseous hydrocarbon with finely divided particles of a mixture of iron oxide and metallic iron in a reaction zone and contacting an oxidizing gas with the iron oxide-metallic iron mixture in a regeneration zone and circulating a suspension of said finely divided particles between said reaction zone and said regeneration zone the steps which comprise originally charging to the reaction zone a finely divided mixture of iron oxide and metallic iron having an atomic ratio of oxygen to iron of between 0.5 and 1.25 to 1, at least a portion of said iron being in the metallic state, passing hydrocarbon gas upwardly through the reaction zone at a superficial velocity between about 0.5 and 5 ft./second, maintaining a suspension of said finely divided particles of iron oxide and metallic iron in the hydrocarbon gas in said reaction zone, said suspension containing at least about 5% by volume of said finely divided particles, maintaining in said reaction zone a temperature suitable for reaction between said hydrocarbon gas and said finely divided particles to produce carbon monoxide and hydrogen, continuously withdrawing finely divided particles from said reaction zone, continuously feeding said withdrawn particles to an oxidizing zone, maintaining a temperature suitable for the oxidation of metallic iron in said oxidizing zone, withdrawing oxidized finely divided particles from said oxidizing zone, returning the oxidized particles to the reaction zone and controlling the rate of circulation of said particles from the reaction zone into the oxidizing zone and thence back into the reaction zone to maintain an atomic ratio of oxygen to iron in the finely divided particles in the reaction zone between about 0.5 and 1.25 to 1, at least a portion of said iron being in the metallic state.

9. The method as defined in claim 8 in which the atomic ratio of oxygen to iron in the finely divided particles within the reaction zone is 1 to 1.

10. The method as defined in claim 8 in which at least ⅙ of a gram atom of free iron is present for each gram atom of oxygen in the finely divided particles within the reaction zone.

11. An improved process for the manufacture of carbon monoxide and hydrogen synthesis gas which comprises maintaining a bed of small solid particles of iron oxide in a fluidized condition by suspension in a gas flowing at a sufficiently low rate that the bulk of the particles are maintained together as a dense highly agitated phase, maintaining the average concentration of oxygen in said bed of iron oxide at approximately 12.5 to 26.3 weight per cent, introducing methane to said fluidized bed as said gas, maintaining a temperature sufficiently high to liberate oxygen from said iron oxide and to oxidize said methane and thereby produce carbon monoxide and hydrogen synthesis gas, removing reduced iron oxide from said fluidized bed and passing same to regeneration, oxidizing said reduced iron oxide and returning same to said fluidized bed.

12. An improved process for the manufacture of carbon monoxide and hydrogen synthesis gas which comprises a maintaining a first bed of small solid particles of iron oxide in a fluidized condition by suspension in a gas flowing at a sufficiently low rate that the bulk of the particles are maintained together as a dense highly agitated phase, introducing methane to said fluidized bed as said gas, maintaining a temperature above 1400° F. to liberate oxygen from said iron oxide and to oxidize said methane and thereby produce carbon monoxide and hydrogen synthesis gas, removing reduced iron oxide from said fluidized bed and passing same to regeneration, oxidizing said reduced iron oxide in the presence of hot gases containing free oxygen, said gases maintaining said iron oxide in a second fluidized bed, and returning said oxidized iron oxide from said second fluidized bed to said first fluidized bed, and withdrawing the spent iron oxide from and introducing the regenerated iron oxide to said first fluidized bed at such a rate that the oxygen content of the iron oxide within said first fluidized bed is in the range of 12.5 to 26.3 weight per cent.

References Cited in the file of this patent

UNITED STATES PATENTS

| | | |
|---|---|---|
| 1,899,184 | De Simo | Feb. 28, 1933 |
| 2,042,285 | Wilke et al. | May 26, 1936 |
| 2,425,754 | Murphree et al. | Aug. 19, 1947 |
| 2,490,986 | Symonds | Dec. 13, 1949 |
| 2,550,742 | Welty, Jr. | May 1, 1951 |
| 2,566,620 | Mayland et al. | Sept. 4, 1951 |

FOREIGN PATENTS

| | | |
|---|---|---|
| 421,462 | Germany | Nov. 12, 1925 |